Patented Feb. 5, 1946

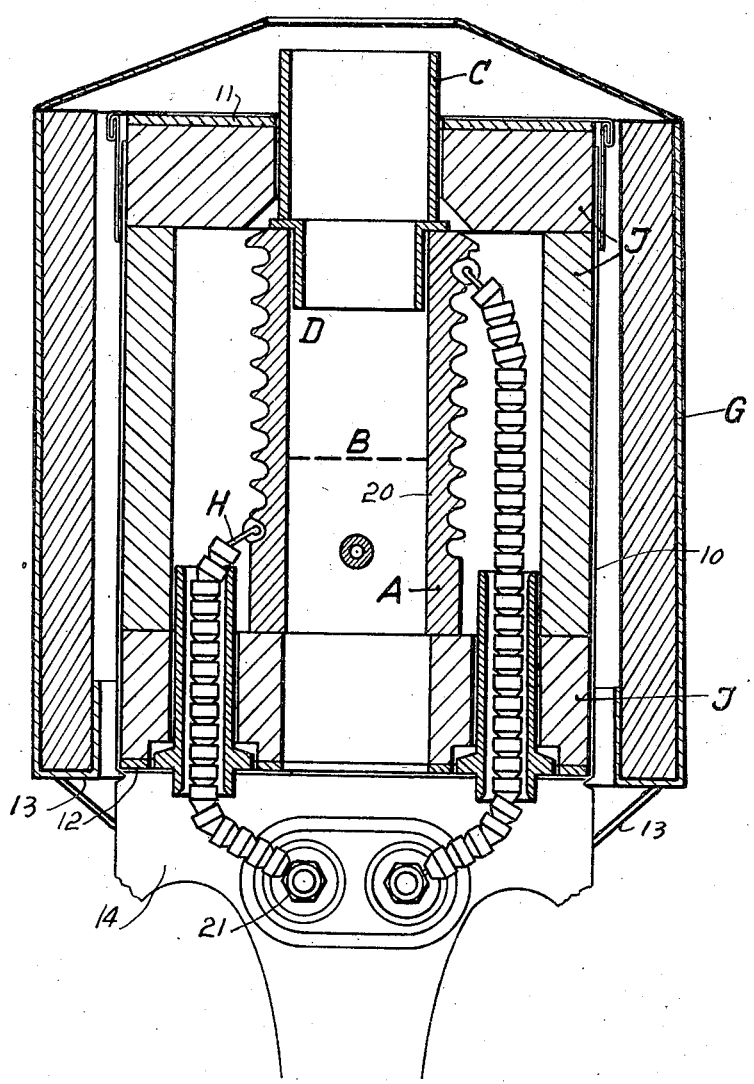

2,394,325

UNITED STATES PATENT OFFICE 2,394,325

PROCESS FOR DISINFECTION AND DESTRUCTION OF BACTERIA

Richard Müller, Berlin, Germany; vested in the Alien Property Custodian

Application June 25, 1940, Serial No. 342,356
In Germany August 2, 1939

5 Claims. (Cl. 21—2)

This invention relates to a process and to suitable apparatus for disinfection and for destruction of bacteria, respectively.

My United States Patent No. 2,235,843 has for its object a process of disinfection by means of silver or silver compounds, characterised in that gaseous silver and silver vapour, respectively, or gaseous and vapourous silver compounds, respectively, are directly used. The process of manufacturing the gaseous silver, and silver vapour, respectively, or the gaseous and vapourous silver compounds, respectively, is preferably performed by heating in an air current silver or silver compounds, or heat-resisting porous substances impregnated with silver or silver compounds.

It has now been found that among the compounds of silver the halides of silver, especially chloride and bromide of silver, display a particularly strong bactericidal effect in a highly humid condition, preferably at a relative air humidity of more than 60 percent.

In order to prepare the vapours of silver halides, tablets, for instance, are used, which contain chloride of silver, and which are heated in an electric heating cylinder to glowing condition.

Experiments are described below, which have been carried out within a closed chamber of 100 x 60 x 60 centimeters in order to ascertain the bactericidal effect exercised by chloride of silver in the presence of steam upon cultures of erysipelas, typhoid fever, paratyphoid fever and, abortus Bang bacilli, staphylococci, streptococci, pyocyanei, and spores of bacteria anthracis.

The bacilli used were, in the manner already known, caused to cling to small patches of cambric, which were suspended in the closed chamber in such a way that from every direction they were exposed to the vapours of silver chloride.

The various percentages of air humidity were brought about according to Obermiller "Die Einstellung von Luft auf bestimmte Trocknungs- oder Feuchtigkeitsgrade mit Hilfe von Salzen und ähnlichen Stoffen und das 'relative' Trocknungsvermögen" (The adjustment of air to certain drying- or humidity percentages with the aid of salts and similar materials, and the "relative" drying capacity), (Zeitschr. f. physik. Chemie, vol. 109, p. 145 of 1924), and were controlled by hygrometers. The slight fluctuations in the course of the tests are due to temperature influences.

After the adequate periods of time the small patches of cambric were taken from the test chamber and put into bouillon. The results were read after the patches had been put in the incubator for 48 hours at 37 centigrades.

The results are shown in detail in the subsequent tables.

By the tests it has been established that at a high degree of humidity, preferably at a relative humidity of more than 60%, the bacilli and spores are destroyed within a comparatively short period and that even anthrax spores are destroyed with certainty, if they have been exposed for eight hours. The other bacteria used in the tests were destroyed either earlier or later, corresponding to the degree of humidity higher than 60%, but under any circumstances, after having been exposed to the vapours of silver chloride for two to six hours. The plus sign (+) signifies growth under the above described conditions and the minus sign (—) signifies destruction.

Test 1

|  | After 1 hour | After 2 hours | After 3 hours | After 4 hours |
|---|---|---|---|---|
| Streptococci | + | + | — | — |
| Staphylococci | + | + | + | + |
| Erysipelas bacilli | + | + | + | — |
| Anthrax spores | + | + | + | + |
| Humidity......percent | 42 | 40 | 37 | 37 |

Test 2

|  | After 1 hour | After 2 hours | After 3 hours | After 4 hours |
|---|---|---|---|---|
| Streptococci | + | + | + | — |
| Staphylococci | + | + | + | — |
| Typhoid fever bacilli | — | — | — | — |
| Anthrax spores | + | + | + | + |
| Humidity......percent | 40 | 40 | 55 | 65 |

Test 3

|  | After 3 hours | After 4 hours | After 5 hours | After 6 hours |
|---|---|---|---|---|
| Pyrocyanei | + | + | + | — |
| Typhoid fever bacilli | + | + | — | — |
| Staphylococci | + | + | + | + |
| Anthrax spores | + | + | + | + |
| Humidity......per cent | 45 | 44 | 44 | 50 |

Test 4

|  | After 4 hours | After 5 hours | After 6 hours | After 7 hours | After 8 hours |
|---|---|---|---|---|---|
| Pyrocyanei | + | — | — | — | — |
| Typhoid fever bacilli | + | + | + | — | — |
| Staphylococci | + | + | + | — | — |
| Anthrax spores | + | + | + | + | — |
| Humidity......per cent | 68 | 70 | 70 | 73 | 73 |

Test 5

|  | After 1 hour | After 2 hours | After 3 hours | After 4 hours |
|---|---|---|---|---|
| Streptococci | + | + | + | − |
| Staphylococci | + | + | + | + |
| Erysipelas bacilli | + | + | − | + |
| Anthrax spores | + | + | + | + |
| Typhoid fever bacilli | + | + | − | − |
| Humidity......per cent.. | 68 | 60 | 58 | 58 |

Test 6

|  | After 1 hour | After 2 hours | After 3 hours | After 4 hours |
|---|---|---|---|---|
| Streptococci | − | − | − | − |
| Staphylococci | − | − | − | − |
| Erysipelas bacilli | − | − | − | − |
| Anthrax spores | + | − | − | − |
| Humidity......per cent.. | 65 | 75 | 75 | 70 |

Test 7

|  | After 1 hours | After 2 hours | After 3 hours | After 4 hours |
|---|---|---|---|---|
| Streptococci | + | − | − | − |
| Staphylococci | + | − | − | − |
| Erysipelas bacilli | − | − | − | − |
| Anthrax spores | + | + | ± | − |
| Humidity......per cent.. | 60 | 62 | 65 | 70 |

Test 8

|  | After 6 hours | After 7 hours | After 8 hours | After 24 hours |
|---|---|---|---|---|
| Paratyphoid fever bacilli | + | + | − | − |
| Abortus Bang bacilli | + | − | − | − |
| Erysipelas bacilli | + | + | − | − |
| Staphylococci | + | + | + | − |
| Streptococci | + | − | − | − |
| Anthrax spores | + | + | + | + |
| Humidity......per cent.. | 50 | 49 | 45 | 50 |

Test 9

|  | After 2 hours | After 4 hours | After 6 hours | After 8 hours | After 24 hours |
|---|---|---|---|---|---|
| Paratyphoid fever bacilli | − | − | − | − | − |
| Abortus Bang bacilli | − | − | − | − | − |
| Erysipelas bacilli | − | − | − | − | − |
| Staphylococci | + | + | − | − | − |
| Streptococci | + | − | − | − | − |
| Anthrax spores | + | + | + | − | − |
| Humidity......per cent.. | 90 | 86 | 90 | 87 | 100 |

It was established that in the production of silver halide vapours, e. g. vapours of silver chloride, for remedial purposes or disinfection a considerable portion of silver chloride is not evaporated due to deposition of metallic silver.

It was, however, found that by an addition of chlorides of alkali or alkali earth metals (sodium chloride, chloride of magnesium, etc.), preferably in the presence of voluminous, inert substances, such as silicic acid, titanic acid, etc. metallic silver is not formed to any considerable extent.

What has been stated with respect to chlorides also applies to the bromides.

The invention further aims to proceed in such a way that a mixture of the silver halide compounds and of the alkali or alkali earth metals chlorides with voluminous substances, such as infusorial earth, silica gel, titanic acid, etc. is compressed so as to form tablets, or that the molten mixture is absorbed by compressed, porous pills.

It was furthermore ascertained that in practising the process it is preferable to proceed, as described below:

If vapours of halides of silver, e. g. a vapour of silver chloride, are produced in small, electrically heated devices, the liquid silver chloride thus formed is very troublesome, because it is readily inclined to creep, will penetrate, or flow around the ceramic substances on which the material used for the electric resistance rests, and thus finally will reach the materials used for the electric resistance, and will destroy them. This penetration, though it cannot be prevented, can, however, be delayed, if the heating appliances are either lined with a sintered or molten substance, such as porcelain or quartz, or are faced with a material protecting the surface by the formation of a layer similar to glass. The flowing-around can, on the contrary, only be prevented by keeping the entire device at a temperature which makes the formation of liquid silver chloride impossible by immediate transformation of the latter into a vapour, which end can be reached by embedding the plant in an insulating material. Though it is true that in the tube used for discharge of the vapours liquid silver chloride will again be formed by condensation, this newly formed silver chloride will also be prevented from doing harm by first keeping the pipe at a certain distance, though only a short one, from the internal hollow space of the heating device, and furthermore in such a way that the lower end of this pipe projects into the device for such a distance that immediate evaporation will again take place. The same applies to the tablets containing chloride of silver, which tablets will discharge liquid silver chloride liable to display a detrimental effect in the stated manner, unless the substances be placed in such a way that the halide of silver will immediately be transformed into the vaporous state; according to experience this will take place in the lowest fourth or fifth part of the heating zone.

In order to prevent under any circumstances detrimental effects as soon as the current is misdirected due to molten silver compounds or molten silver, or due to a penetration of the ceramic body by silver or silver compounds, the supporting grid, on which the tablets containing silver chloride are placed, is grounded, wherefore an arcing of the current, if any, will not cause any danger.

One of the many possible embodiments of the device is shown in the drawing.

Supported from a stand or pedestal 14 by struts 13 is an outer casing G of sheet metal which is bent inwardly and upwardly at its bottom and serves as a support for a cylinder or slabs of porous material for holding water in its pores to be evaporated.

Inside the casing G and supported on the pedestal 14 is a second casing 10 of metal, lined with a suitable heat insulating material I of a character capable of withstanding temperatures developed by the heating element inside with refractory material held between the upper and lower gaskets 11 and 12, respectively, and the tubular heating unit A. The casing 10 contains tube 20 of ceramic material forming part of the heating unit and on the outside of tube 20 is wound an electric conductor H. This conductor is brought into the casing 10 from outlet terminals 21 through bushings 22. The conductor H, except for the portion on the tube 20, is armored.

The upper portion of the casing G is formed as a truncated cone with a central opening and the cylindrical member 20 is surmounted by a tube C preferably of refractory material which terminates a short distance below the opening. Tube C discharging the vapours of silver halide, terminates at D placed in the uppermost fourth part of the heating device. Grid B, which supports the tablets containing silver chloride, is placed in the neighbourhood of, or within the lowest fourth of the heating zone.

As small quantities of hydrochloric acid might be formed due to chemical transformation of the halide compounds with silicic acid, or titanic acid, or the like, in the presence of steam, especially due to overheating, it is preferable not to pass the steam through the heating tube, but to admit it only to the evaporated silver compounds near the upper end of the tube. In order to accomplish this the water is evaporated from the porous material lining casing G by the heat radiated from the heating element through the casing 10. The steam is thereupon mixed with the vaporous halide of silver escaping from the heating tube. By an addition of small quantities of ammonium carbonate to the water it is possible to bring about an alkalinization of the steam, if desirable.

What I claim is:

1. A process for disinfection, and for destruction of bacteria, respectively, by means of silver compounds, characterised in that said bacteria are subjected to the action of halogen silver compounds in a vapourous state at a high degree of humidity.

2. A process for disinfection, and for destruction of bacteria, respectively, by means of silver compounds, characterised in that said bacteria are subjected to the action of halogen silver compounds in a vapourous state at a relative humidity of more than 60%.

3. A process for disinfection, and for destruction of bacteria, respectively, by means of silver compounds, characterised in that said bacteria are subjected to the action of silver chloride in a vapourous state at a high degree of humidity.

4. A process for disinfection, and for destruction of bacteria, respectively, by means of silver compounds, characterised in that said bacteria are subjected to the action of compounds of bromide silver in their gaseous or vapourous state at a high degree of humidity.

5. A process of forming a vapor for disinfection purposes which consists in heating a mixture of a halogen silver compound with a substance selected from the group consisting of alkali and alkali earth metal halogenides with a voluminous inert substance such as infusorial earth, silica gel or titanic acid, and mixing water vapor with the vapor produced by such heating.

RICHARD MÜLLER.